US005379031A

United States Patent [19]

Mondrosch et al.

[11] Patent Number: 5,379,031

[45] Date of Patent: Jan. 3, 1995

[54] METHOD AND APPARATUS FOR CONVERSION OF MAILDROP MESSAGE TO SELECTIVE CALL INDIVIDUAL MESSAGE

[75] Inventors: Nancy E. Mondrosch, Boynton Beach; Gregory L. Cannon, Delray Beach, both of Fla.

[73] Assignee: Motorola, Inc., Schaumburg, Ill.

[21] Appl. No.: 963,788

[22] Filed: Oct. 19, 1992

[51] Int. Cl.[6] .......... H04Q 1/00

[52] U.S. Cl. .......... 340/825.07; 340/825.44; 455/38.1; 349/57

[58] Field of Search .......... 340/825.07, 825.44, 340/825.48, 825.47; 455/38.1; 379/57

[56] References Cited

U.S. PATENT DOCUMENTS

| | | | |
|---|---|---|---|
| 4,268,031 | 8/1988 | Mori | 340/825.44 |
| 4,786,901 | 11/1988 | Matai et al. | |
| 4,873,519 | 10/1989 | Matai et al. | |
| 4,873,520 | 10/1989 | Fisch et al. | 340/825.44 |
| 4,949,085 | 8/1990 | Fisch et al. | 340/825.44 |

*Primary Examiner*—Donald J. Yusko
*Assistant Examiner*—Brian Zimmerman
*Attorney, Agent, or Firm*—Gregg Rasor

[57] ABSTRACT

A method and apparatus in a selective call receiver allow a user to receive maildrop message without losing access to previously received but unread maildrop messages in the same message slot. The selective call receiver comprises an address correlator (107) which determines whether received selective call signals comprise an individual or maildrop address assigned to the selective call receiver. A message memory (122) comprises an individual message portion (126) having an individual memory directory (127) and a maildrop message portion (128) having a maildrop memory directory (129). A processor (112) determines whether the decoded selective call message is an individual message or a maildrop message (204), determines whether a previously received maildrop message stored in the maildrop portion of the memory and having a maildrop address equivalent to the maildrop address of the decoded selective call message is "read" or "unread" (216), and provides identification information corresponding to the previously received one of the maildrop messages from the maildrop memory directory means to the individual memory directory means (222) if the previously received one of the maildrop messages is "unread".

20 Claims, 3 Drawing Sheets

METHOD AND APPARATUS FOR CONVERSION OF MAILDROP MESSAGE TO SELECTIVE CALL INDIVIDUAL MESSAGE

FIELD OF THE INVENTION

This invention relates in general to a selective call receiver, and in particular to a method and apparatus for converting selective call messages of a first type to selective call messages of a second type.

BACKGROUND OF THE INVENTION

Selective call signaling systems (e.g., paging systems) provide one-way radio frequency (RF) communication of selective call messages to a selective call receiver. Prior art systems primarily delivered individually addressed messages from a message originator to a unique selective call receiver. The message originator contacts the selective call system via the public switched telephone network system or other input interface means and provides the message information to a selective call terminal. The message information is coupled to address information to form a selective call message. The address information uniquely identifies the selective call receiver. The selective call message is encoded into a conventional signaling protocol, modulated onto a carrier signal, and transmitted as an RF signal to the selective call receiver. The selective call receiver receives the signal, demodulates and decodes the signal to recover the message and address information, correlates the address information with known addresses assigned to the selective call receiver, and presents the message to the system subscriber who is the user of the receiver if the address information positively correlates.

More recently, selective call systems have offered maildrop services which allows the assignment of a common maildrop address to a number of selective call receivers. One such maildrop service is described in U.S. Pat. No. 4,873,519. Maildrop selective call receivers typically have a number of slots reserved for maildrop messages. When a maildrop message is received, it is stored in the corresponding slot, overwriting any maildrop message previously received that was addressed to that slot.

The importance of maildrop services has increased with the advent of information services which provide timely updates of financial, sports, and news information as commonly addressed messages to a number of selective call receivers. Yet, even with the increased importance of maildrop, the maildrop messages when received continue to overwrite previously received messages with the same maildrop address. All information contained in the prior maildrop message is lost to the user. The problem is exacerbated when the user has not read the prior maildrop message before it is deleted.

Thus, what is needed is a selective call receiver which, upon receipt of a maildrop message, does not overwrite a maildrop message previously received on the same address if the previous maildrop message has not been read.

SUMMARY OF THE INVENTION

In carrying out the objects of the invention in one form, there is provided a selective call receiver comprising a receiver for receiving and demodulating selective call signals and an address correlator for determining whether the selective call signals comprise an address assigned to the selective call receiver. The selective call receiver also comprises a decoder coupled to the address correlator for decoding the selective call signals to recover a decoded selective call message and a message memory comprising a first portion for storing individual messages and a second portion for storing maildrop messages, wherein the first portion comprises an individual memory directory for storing data access information corresponding to the individual messages stored in the first portion, and wherein the second portion comprises a maildrop memory directory for storing data access information corresponding to the maildrop messages stored in the second portion. A controller of the selective call receiver is coupled to the address correlator, the decoder and the memory for determining whether the decoded selective call message is an individual message or a maildrop message, and for determining, if the decoded selective call message is a maildrop message, whether a previously received one of the maildrop messages stored in the second portion of the memory and having a maildrop address equivalent to the maildrop address of the decoded selective call message is "read" or "unread". The controller also provides the decoded selective call message to the second portion of the memory for storing therein and identification information corresponding to the decoded selective call receiver to the maildrop memory directory and identification information corresponding to the previously received one of the maildrop messages from the maildrop memory directory means to the individual memory directory means if the previously received one of the maildrop messages is "unread".

In another form there is provided a method in a selective call receiver for storing messages. The method comprises the steps of (a) receiving a selective call message having a selective call address, (b) determining whether the selective call address is an individual address or a common address, (c) in response to determining that the selective call address is a common address, determining if a previously received message having the common address has been read, and (d) storing data access information corresponding to the previously received message in a directory of a first portion of memory for storing selective call messages having an individual address in response to determining that the previously received message has not been read.

DETAILED DESCRIPTION OF THE INVENTION

Figure 1:
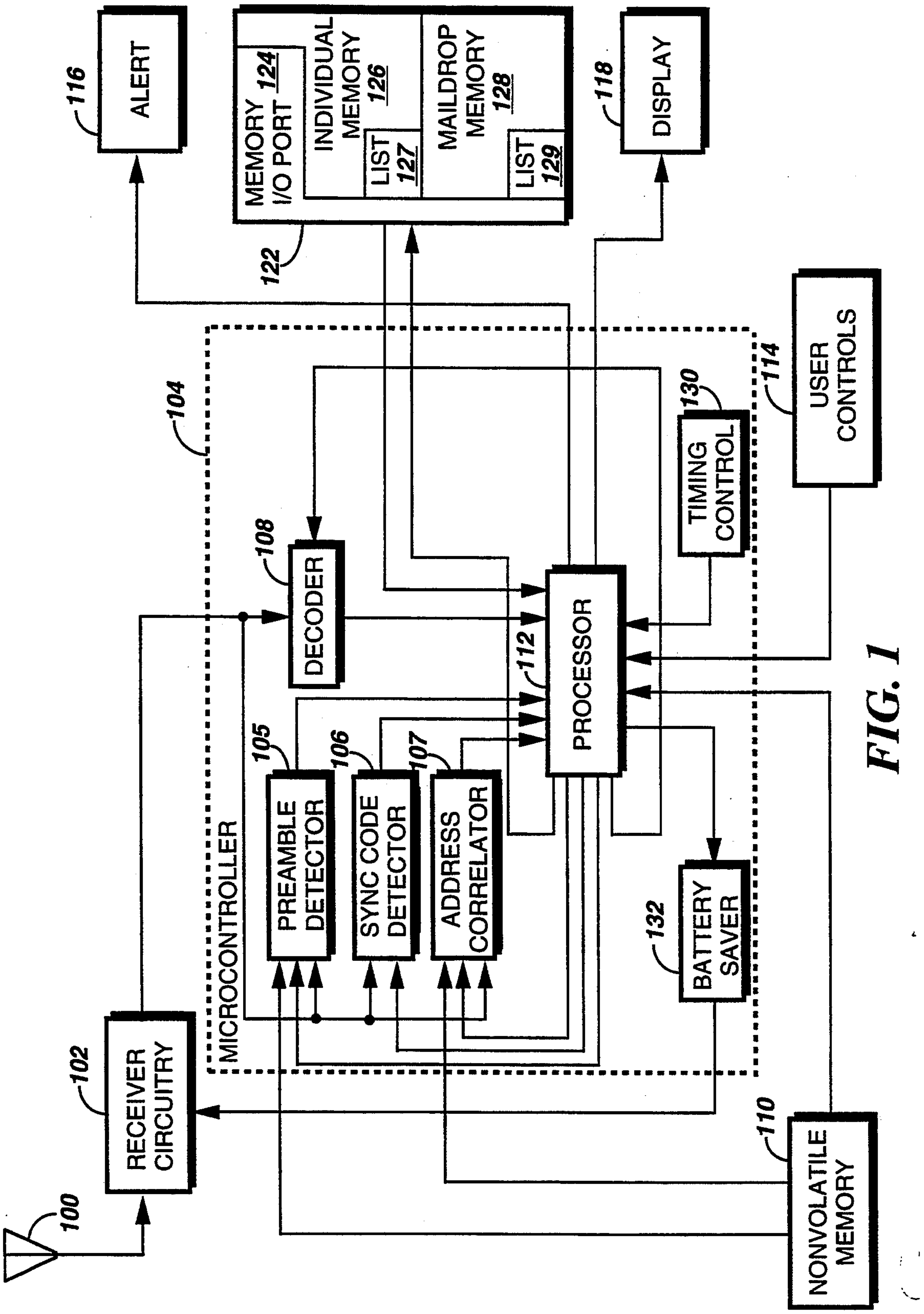
FIG. 1 is a block diagram of selective call receiver in accordance with the preferred embodiment of the present invention.

Referring to FIG. 1, a preferred embodiment of a selective call receiver in accordance with the present invention is depicted. Selective call signals are received at an antenna 100 of the selective call receiver. The signal is provided to receiver circuitry 102 which demodulates the signal. The receiver circuitry 102 provides the demodulated signal to a microcontroller 104 for processing thereby. The demodulated signal is provided to a preamble detector 105, a sync code detector 106, an address correlator 107, and a decoder 108.

A processor 112 provides a start signal to the preamble detector 105 to begin attempted detection of the preamble code. The preamble detector 105 attempts to detect the preamble from within the demodulated signal. A predetermined preamble code may be stored in a nonvolatile memory 110 and retrieved therefrom for comparison to the received signal or the preamble may consist of a plurality of zero-to-one bit value transitions. Upon detection of the preamble, the preamble detector 105 provides a signal to the processor 112. The processor 112 controls the operation of the receiver, utilizing the signal from the preamble detector.

Upon receipt of a start signal from the processor 112, the sync code detector 106 examines the demodulated signal to detect the occurrence of a synchronization (sync) code of the signalling protocol to maintain synchronization therewith. The sync code detector 106 provides a signal to the processor 112 in response to detection of the sync code.

In a similar manner, the address correlator 107 attempts to correlate the information from the demodulated signal with any of a number of predetermined addresses assigned to the receiver and stored in the nonvolatile memory 110 upon reception of a start signal from the processor 112. The address correlator 107 also provides a signal to the processor 112 upon determination of address correlation or address noncorrelation. After address detection, the decoder 108 is activated by the processor 112 to decode the demodulated signal and provide the decoded signal to the processor 112.

A timing signal is generated by the processor 112 in accordance with timing signals from a timing control 130 within the microcontroller 104. The timing signal is utilized to determine the symbol rate of the signal for provision to the preamble detector 105, the sync code detector 106, the address correlator 107, and the decoder 108 to assist the preamble detector 105 and the sync code detector 106 in detecting the preamble code and the sync code, respectively, to assist the address correlator 106 in correlating for an address assigned to the selective call receiver, and to assist the decoder 108 in decoding the information from within the signal.

The processor 112 also performs the conventional functions of the selective call receiver such as activating an alert 116 upon reception of a selective call message, receiving user inputs via user controls 114 and acting thereon, and providing information such as selective call messages to a display 118 for viewing by the user. The processor 112 also accesses information stored in the nonvolatile memory 110 for operation of the receiver. A battery saving circuit 132 provides a signal to the receiver circuitry 102 to turn the receiver circuitry 102 ON or OFF to conserve power. The processor 112 provides an energization signal to the battery saving circuit 132 to turn the receiver circuit ON at times after occurrence of an event as measured by the processor 112. Such events would include a signal from the preamble detector 105 indicating detection of the predetermined preamble code, a signal from the address correlator 107 indicating detection of the address assigned to the receiver, or a signal from the sync code detector 106 indicating detection of the sync code. In addition, the address correlator 107 provides signals to the processor in accordance with the present invention to cause the processor to generate a signal for provision to the battery saving circuit 132 to turn the receiver circuitry 102 OFF.

In accordance with the present invention, the processor 112 provides selective call message information to and accesses selective call message information from a memory 122, such as a random access memory (RAM), for storage therein or recalling stored information from the memory 122. The memory 122 can be external to the microcontroller 104 or could be internal thereto. The memory 122 comprises an input/output port 124 for coordinating communication with the processor 112. The message memory 122 is also partitioned into two portions, each separate one from another. Preferably, the memory 122 is a 128K memory which is partitioned into a 96K first portion 126 and a 32K second portion 128.

The first portion is individual memory 126 for storing selective call messages received on selective call addresses uniquely assigned to the selective call receiver. Associated with the individual memory 126 is a hierarchical list 127 which acts as a directory for the individual memory 126. The list 127 contains message identifiers for each of the selective call messages stored within the individual memory 126. Each of the message identifiers comprises a number of elements which serve to identify the selective call message and allow the processor 112 to retrieve the data of the selective call message. These elements can include, for example, a time that the message was received, the status of the message (i.e., whether the message has been read or is unread, whether the message is locked or unlocked, etc.), the length of the message, and data access points within the individual memory 126 to identify where the selective call message is stored.

A second portion of a selective call memory 122 is memory 128 set aside for maildrop type selective call messages. Maildrop type selective call messages are identified by a common address which is assigned to a selective call receiver and other selective call receivers within the selective call system. When information is received on a maildrop selective call address, the message is stored in the maildrop memory 128 at a specified location, such as a maildrop message slot. Successive messages received having the same selective call address will be stored at the same maildrop message slot within the maildrop memory 128. The maildrop memory 128 also has a list 129, such as a directory, associated therewith comprising message identifiers to identify the maildrop messages and where the corresponding maildrop message slots are located within the memory 128. It can be appreciated that there could be additional types of messages and that the memory 122 could be partitioned into more than two portions.

Conventionally, maildrop memory was restricted to a predetermined number of slots and, unless one resorted to dynamic allocation of the memory between maildrop and individual messages, one could not increase the number of slots or alter the size of the slots or store two messages for the same slot. With the advent of larger capacity memory chips on small substrates, small devices such as selective call receivers can have large memories. In the preferred embodiment of the present invention, 32K memory is allocated for maildrop memory and allows for double storing or triple storing maildrop slots without overloading the memory.

Figure 2:
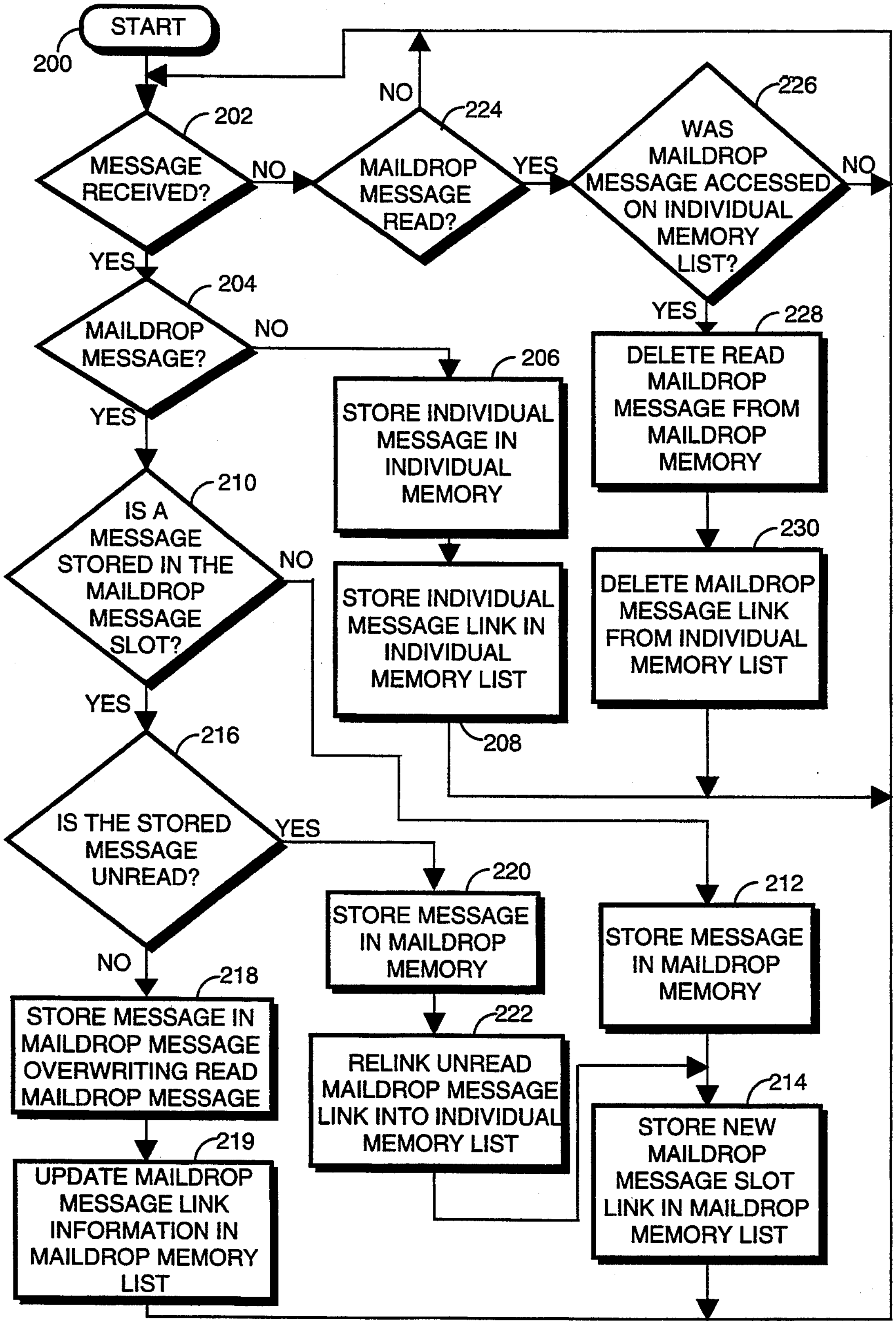
FIG. 2 is a flow diagram of the operation of the selective call receiver of FIG. 1 in accordance with the preferred embodiment of the present invention.

Referring next to FIG. 2, a flowchart of the operation of the selective call receiver microcontroller 104 during message reception and storage begins upon the receiver being turned on 200. In accordance with the present invention, the processor 112 (FIG. 1) awaits reception of a message 202. A positive address correlation signal from the address correlator 107 to the processor 112 informs the processor 112 that a message has been received 202.

When a message is received 202, the address which has been positively correlated is examined to determine if the received message is a maildrop type selective call or an individual type selective call message 204. If the received and decoded selective call message is not a maildrop type message 204, it is an individual message and is stored 206 in the individual memory 126 (FIG. 1). The elements identifying the individual message and its location within the individual memory 126, called the individual message link, is stored 208 in the individual memory list 127 and processing returns to await reception of a next message 202.

If the received and decoded selective call message is a maildrop message 204, a positively correlated address is examined and a location within the maildrop memory 128 is also examined to determine if there is a message stored in a maildrop message slot assigned to the positively correlated address 210. A maildrop message slot is established upon reception of a first message with the corresponding maildrop address. If there is no message stored in the maildrop message slot 210 (i.e., a maildrop message slot has not been established), then no messages have been received with that particular selective call maildrop address. The selective call message is stored 212 in the maildrop memory 128 (FIG. 1) and a new maildrop message slot link is established identifying the maildrop message slot, the status of the current message stored in the maildrop message slot, and the location of the maildrop message slot within the maildrop memory 128. The new maildrop message slot link is stored 214 in the maildrop memory list 129 (FIG. 1) and processing returns to await reception of the next message 202.

If there is a message stored in the maildrop message slot 210, the maildrop message slot link information is examined to determine if the stored maildrop message has been read or is unread 216. If the stored maildrop message has been read 216, the newly received and decoded selective call maildrop message is stored 218 in the maildrop memory 128 (FIG. 1), thereby overwriting the previously read selective call maildrop message. The maildrop message slot link information in the maildrop memory list 129 is updated 219 and processing returns to await the next received message 202.

In accordance with the present invention, if the stored message is unread 216, the received and decoded selective call maildrop message is stored at a new location in the maildrop memory 220, thereby establishing a new location for the maildrop message slot. The maildrop message link information on the unread selective call maildrop message is relinked 222 into the individual memory list 127 (FIG. 1). The maildrop message slot link identifying the unread stored maildrop message is thereby removed from the maildrop memory list 129 and the new maildrop message slot link information is linked 214 into the maildrop memory list 129 to identify the new location of the selective call maildrop message slot and information concerning the current maildrop message stored therein.

In accordance with another aspect of the present invention concerning message memory management, if a message is not received 202, processing next determines whether a maildrop message has been read 224. If a maildrop message has not been read 224, processing remains in an idle loop performing conventional selective call operations until either a selective call message is received 202 or a maildrop message is read 224.

When a maildrop selective call message is read 224, a determination is made whether the maildrop message was accessed 226 from the maildrop memory list 129 or the individual memory list 127 (FIG. 1). If the maildrop message was accessed from the maildrop memory list 129, processing returns to the idle loop to await further microcontroller operations. It can be appreciated that the status of the maildrop message as shown in the information in the maildrop memory list 129 will change from "UNREAD" to "READ" if the maildrop message had not been read before.

If the maildrop message was accessed 226 from information within the individual memory list 127, the read selective call maildrop message is deleted 228 from the maildrop memory 128 (FIG. 1) and the maildrop message link information is deleted 230 from the individual memory list 127. Processing then returns to wait for a message to be received 202 or a maildrop message to be read 224, Referring next to FIGS. 3 and 4, the memory 122 is shown with blocks, each of the blocks indicating messages stored within the individual memory 126 and maildrop message slots within the maildrop memory 128. The messages within the individual memory 126 are identified as they are received and are stored in the individual memory 126. The slots within the maildrop memory 128 are numbered in accordance with the maildrop address on which the message are received. Blocks are also shown in the individual memory list 127 and the maildrop memory list 129 to indicate data access information stored therein. The data access information is identified similarly to the message/slot block to which the list information refers. The data access blocks are linked together to depict how the information is accessed when a user scrolls through messages in the memory 122. For example, after viewing the seventh individual message (IM 7), when a user proceeds to the next message Individual Message 1 (IM 1) will be viewed.

Figure 3:
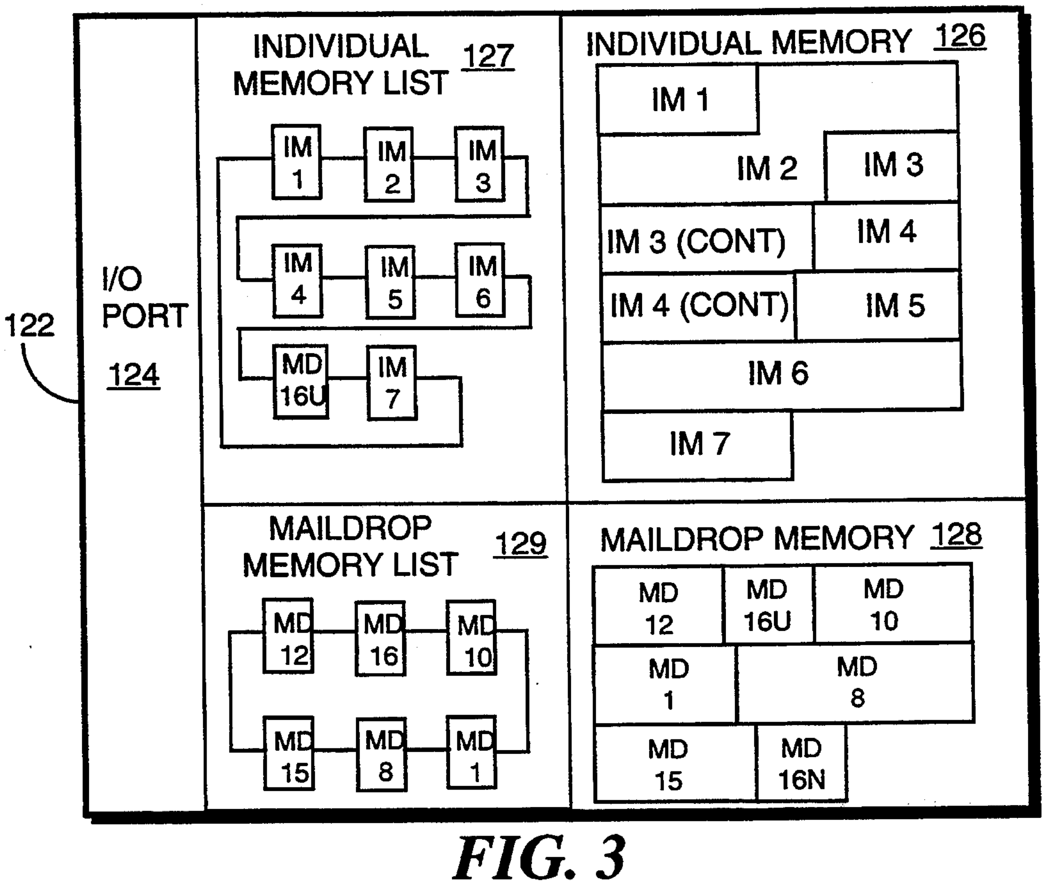
FIGS. 3 and 4 are diagrams of the selective call message memory of FIG. 1 in accordance with the preferred embodiment of the present invention..

Referring to FIG. 3, seven individual selective call messages have been received and stored in the individual memory 126. Also, selective call maildrop messages have been received on six different selective call maildrop addresses. The maildrop memory list 129 indicates information received on maildrop slots MD 12, MD 16, MD 10, MD 15, MD 8, and MD 1.

In accordance with the present invention, after reception of Individual Message 6 (IM 6) and before reception of Individual Message 7 (IM 7), a selective call maildrop message for Maildrop Slot 16 (MD 16N) was received while an unread selective call maildrop message was stored in Maildrop Slot 16 (MD 16U). As indicated in the maildrop memory 128, the unread maildrop message (MD 16U) remains stored while the new maildrop message and new Maildrop Slot 16 (MD 16N) is also stored in a maildrop memory 128. The data access information for the unread maildrop message (MD 16U) is relinked to be accessed from the individual memory list 127 while the data access information on the new maildrop selective call message (MD 16N) is linked into the maildrop memory list 129. Thus, the unread message in Message Slot 16 (MD 16U) can still be read, even after subsequent messages have been received on and stored in Message Slot 16. The unread message can be accessed by the user by scrolling through individual messages until, after Individual Message 6 (IM 6) and before Individual Message 7 (IM 7), the data access information referring to the unread message (MD 16U) is reached. The unread maildrop message will then be recalled from the maildrop memory 128 and presented to the user.

Figure 4:
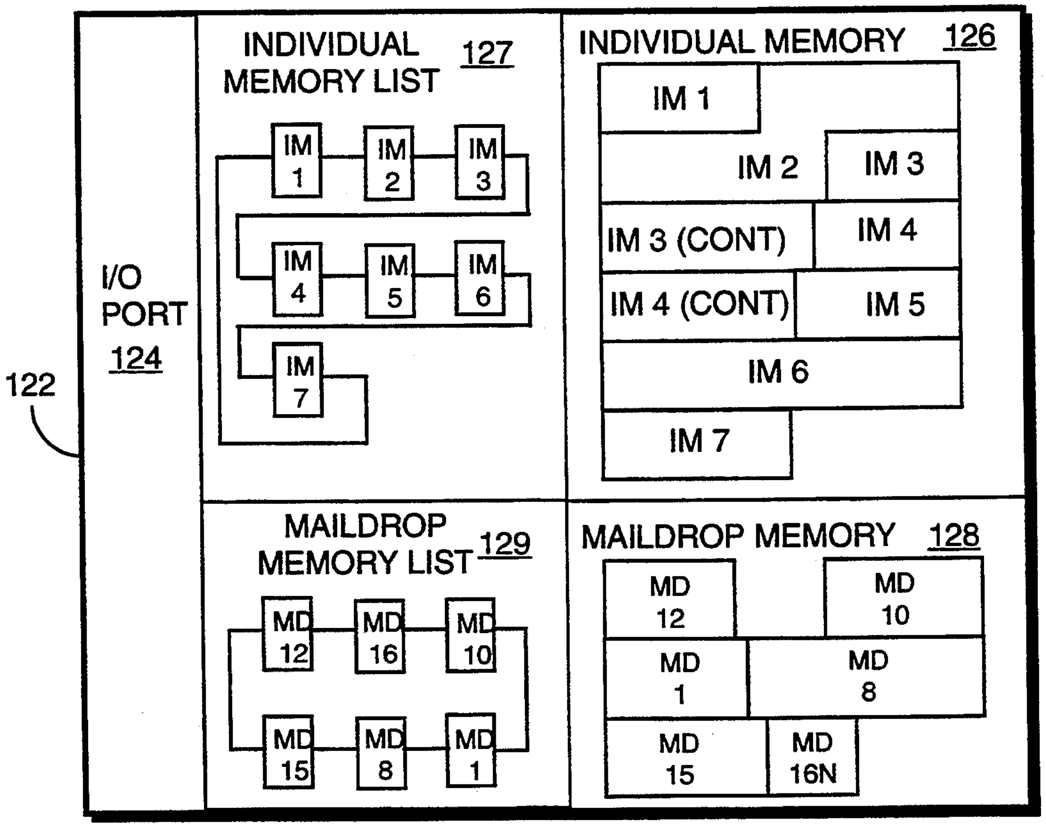

Referring to FIG. 4, automatic deletion of certain maildrop messages in accordance with the present invention is shown. Immediately after an unread maildrop message is accessed from the individual memory list 127 and read (such as MD 16U), the maildrop message is deleted from the maildrop memory 128 (i.e., a gap is formed between Maildrop Slot 12 (MD 12) and Maildrop Slot 10 (MD 10). Also, the data access information previously stored in the individual memory list is deleted such that one can scroll directly from Individual Message 6 (IM 6) to Individual Message 7 (IM 7).

By now it should be appreciated that there has been provided a method and apparatus to prevent deletion of unread information in a maildrop memory 128 until it has been read by the selective call receiver user. The method and apparatus utilizes larger message memory in the selective call receiver and allows unread maildrop messages to remain stored in the maildrop memory until read while subsequent maildrop messages for the same maildrop slot are received and stored in the maildrop memory. The unread maildrop message is accessed through data access information stored in the directory of the individual memory. Once the maildrop message is accessed through the individual message directory and read, the message is deleted from the maildrop memory and the data access information is deleted from the individual message directory.

We claim:

1. A selective call receiver comprising:

receiving means for receiving and demodulating selective call signals;

decoding means coupled to the receiving means for decoding the selective call signals to recover a decoded selective call message;

first determining means coupled to the decoding means for determining whether the decoded selective call message is of a first type or a second type;

first memory means for storing selective call messages of a first message type;

first memory directory means coupled to the first memory means for storing identification information corresponding to each of the selective call messages stored in the first memory means;

second memory means for storing selective call messages of a second message type;

second memory directory means coupled to the second memory means for storing identification information corresponding to each of the selective call messages stored in the second memory means;

second determining means coupled to the second memory directory means for determining whether one of the selective call messages stored in the second memory means is of a first status or a second status in response to the identification information stored in the second memory directory means; and control means coupled to the first and second determining means and the decoding means for providing the decoded selective call message to the second memory means and identification information corresponding to the decoded selective call receiver to the second memory directory means and providing identification information corresponding to one of the selective call messages stored at the location in the second memory means where the decoded selective call message is to be stored from the second memory directory means to the first memory directory means if the first determining means determines that the decoded selective call message is of the second type and the second determining means determines that one of the selective call messages stored at the location in the second memory means where the decoded selective call message is to be stored is of the second status.

2. The selective call receiver of claim 1 wherein the control means further provides the decoded selective call message to the second memory means and identification information corresponding to the decoded selective call receiver to the second memory directory means if the first determining means determines that the decoded selective call message is of the second type and the second determining means determines that one of the selective call messages stored at the location in the second memory means where the decoded selective call message is to be stored is of the first status.

3. The selective call receiver of claim 1 wherein the control means further provides the decoded selective call message to the first memory means means and identification information corresponding to the decoded selective call message to the first memory directory means if the first determining means determines that the decoded selective call message is of the first type.

4. The selective call receiver of claim 1 wherein the first status is "read" and the second status is "unread".

5. The selective call receiver of claim 1 wherein the first type is individual message type and the second type is maildrop message type.

6. The selective call receiver of claim 5 wherein the maildrop message type is information service type.

7. The selective call receiver of claim 1 wherein the decoded selective call message comprises a selective call address, and wherein the first determining means determines whether the decoded selective call message is of the first type or the second type in response to the selective call address.

8. The selective call receiver of claim 4 wherein the control means further deletes the one of the selective call messages stored at the location in the second memory means where the decoded selective call message was to be stored in response to the one of the selective call messages having a status of "unread" switched to a status of "read".

9. The selective call receiver of claim 8 wherein the control means further deletes the identification information corresponding to the one of the selective call messages stored in the first memory directory means in response to the one of the selective call messages having a status of "unread" switched to a status of "read".

10. A method in a selective call receiver for storing messages comprising the steps of:

receiving a selective call message having a selective call address;

determining whether the selective call address is an individual address or a common address;

in response to determining that the selective call address is a common address, determining if a previously received message having the common address has been read;

linking data access information corresponding to the previously received message into a directory of a first portion of memory for storing selective call messages having an individual address in response to determining that the previously received message has not been read.

11. The method according to claim 10 further comprising the step of:

storing the received selective call information in a second portion of memory for storing selective call messages having a common address at a location other than a location of the previously received message in response to determining that the previously received message has not been read.

12. The method according to claim 10 further comprising the step of:

storing data access information corresponding to the received selective call message in a directory of the second portion of memory thereby overwriting data access information corresponding to the previously received message.

13. The method according to claim 10 further comprising the step of:

reading the previously stored message; and deleting the data access information corresponding to the previously received message in response to reading the previously received message.

14. A selective call receiver comprising:

a receiver for receiving and demodulating selective call signals;

an address correlator for determining whether the selective call signals comprise an address assigned to the selective call receiver;

a decoder coupled to the address correlator for decoding the selective call signals to recover a decoded selective call message;

a message memory comprising a first portion for storing individual messages and a second portion for storing maildrop messages, wherein the first portion comprises an individual memory directory for storing data access information corresponding to the individual messages stored in the first portion, and wherein the second portion comprises a maildrop memory directory for storing data access information corresponding to the maildrop messages stored in the second portion; and a controller coupled to the address correlator, the decoder and the memory for determining whether the decoded selective call message is an individual message or a maildrop message, and for determining, if the decoded selective call message is a maildrop message, whether a previously received one of the maildrop messages stored in the second portion of the memory and having a maildrop address equivalent to the maildrop address of the decoded selective call message is "read" or "unread", and for providing the decoded selective call message to the second portion of the memory for storing therein and identification information corresponding to the decoded selective call receiver to the maildrop memory directory and identification information corresponding to the previously received one of the maildrop messages from the maildrop memory directory means to the individual memory directory means if the previously received one of the maildrop messages is "unread".

15. The selective call receiver of claim 14 wherein the controller further provides the decoded selective call message to the second portion of the memory and identification information corresponding to the decoded selective call receiver to the maildrop memory directory means if the decoded selective call message is a maildrop message and the previously received one of the maildrop messages is "read".

16. The selective call receiver of claim 14 wherein the controller further provides the decoded selective call message to the first portion of the memory and identification information corresponding to the decoded selective call message to the individual memory directory means if the decoded selective call message is an individual message.

17. The selective call receiver of claim 14 further comprising:

user controls for generating user control signals in response to user activation thereof and coupled to the controller for providing the user control signals thereto; and a display coupled to the controller for displaying the decoded selective call message in response to the user control signals.

18. The selective call receiver of claim 17 wherein the controller recalls the previously received one of the maildrop messages from the second portion of the memory by accessing identification information in the individual memory directory in response to the user control signals and for providing the previously received one of the maildrop messages to the display for presentation to a user thereof.

19. The selective call receiver of claim 18 wherein the controller deletes the previously received one of the maildrop messages in response to the controller recalling the previously received one of the maildrop messages from the second portion of the memory.

20. The selective call receiver of claim 18 wherein the controller deletes the identification information corresponding to the previously received one of the maildrop messages in response to the controller recalling the previously received one of the maildrop messages from the second portion of the memory.

* * * * *